United States Patent [19]

Gubitosa et al.

[11] Patent Number: 5,492,877
[45] Date of Patent: Feb. 20, 1996

[54] SUPPORTED METAL CATALYST FOR HYDROGENATING ORGANIC COMPOUNDS AND PROCESS FOR PREPARING IT

[75] Inventors: Giuseppe Gubitosa, Novara; Maurizio Giampietri, Trecate; Giuliano Vecchiato, Padova, all of Italy

[73] Assignee: Ministero Dell 'Universita' E Della Ricerca Scientifica Tecnologica, Milan, Italy

[21] Appl. No.: 285,701

[22] Filed: Aug. 3, 1994

Related U.S. Application Data

[63] Continuation of Ser. No. 66,874, May 25, 1993, abandoned.

[30] Foreign Application Priority Data

May 28, 1992 [IT] Italy .................................. MI92A1308

[51] Int. Cl.⁶ ............................. B01J 35/10; B01J 21/06; B01J 23/755; B01J 37/18
[52] U.S. Cl. .......................................... 502/245; 502/234
[58] Field of Search ..................... 502/331, 245, 502/234

[56] References Cited

U.S. PATENT DOCUMENTS

| | | | |
|---|---|---|---|
| 2,750,261 | 6/1956 | Ipatieff et al. | 502/234 X |
| 3,383,417 | 5/1968 | Lichtenwalter | 564/480 |
| 4,088,603 | 5/1978 | Carter et al. | 502/331 |
| 4,184,982 | 1/1980 | Schroeder et al. | 502/234 |
| 4,213,882 | 7/1980 | Kranich | 502/63 |
| 4,251,394 | 2/1981 | Carter et al. | 502/234 |
| 4,725,573 | 2/1988 | Mesters et al. | 502/245 |

FOREIGN PATENT DOCUMENTS

| | | |
|---|---|---|
| 0384542 | 8/1990 | European Pat. Off. . |
| 2218936 | 9/1974 | France . |
| 2310802 | 12/1976 | France . |
| 2066690 | 7/1981 | United Kingdom . |

OTHER PUBLICATIONS

*Handbook of Chemical Synonyms and Trade Names*, Gardner, W., ed., CRC Press, Inc., 1978, p. 376.

*Primary Examiner*—Douglas J. McGinty
*Attorney, Agent, or Firm*—Rogers & Wells

[57] ABSTRACT

A supported metal catalyst for the hydrogenation of oils and fats is obtained by causing a porous carriers to interact with an Ni and Cu containing solution in a molar ratio of Ni/Cu comprised within the range of from 1 to 8, and subsequently treating the resulting solid reaction product, after preliminary drying and calcination, with a flowing hydrogen stream at a temperature comprised within the range of from 200° to 600° C.

2 Claims, No Drawings

SUPPORTED METAL CATALYST FOR HYDROGENATING ORGANIC COMPOUNDS AND PROCESS FOR PREPARING IT

This application is a continuation of U.S. application Ser. No. 08/066,874, abandoned.

The present invention relates to a novel supported metal catalyst suitable for hydrogenating organic substances and in particular edible oils and fats.

It is well-known that the most demanded qualities from a catalyst are high activity and selectivity. In the case of chemical processes in liquid phase, in which the supported metal catalyst is suspended as a powder in the reaction media, the causes for low values of selectivity and activity of the catalyst may be many, ranging from reactant diffusion phenomena, up to a different dispersion of the active phase on the carrier. In particular, in the case of the hydrogenation of high molecular weight organic compounds, such as oils and fats, the diffusion phenomena inside the interior of the pores of the catalyst have a high influence on the selectivity and activity of the same catalyst.

In order to improve such properties, catalysts must be used which display suitable morphology and porous structure and a high dispersion of the active element, so as to secure high performance rates in the hydrogenation reactions. At present, in the reactions of catalytic hydrogenation of organic substances, one from most used metals as catalysts, is nickel. In particular, in the hydrogenation of oils and fats, both for industrial purposes and for alimentary industry, nickel catalysts are used in which the metal concentration may even reach as high values as 25% by weight.

The purpose of the present invention is of proposing a supported hydrogenation catalyst which displays a catalytic performance comparable to, or higher than, those of catalysts based on nickel only, but with a Ni concentration which is approximately halved.

According to the present invention, such a purpose is achieved thanks to the supported catalyst comprising nickel and copper in an atomic ratio of Ni/Cu comprised within the range of from 1 to 8.

The catalysts based on copper alone, when prepared according to the same methodology as of the Ni—Cu based catalysts according to the present invention, do not practically display any catalytic activity in the same hydrogenation reaction. Furthermore, for the catalysts according to the present invention it was verified that their reduction takes place already at a temperature of only 150° C. On the basis of such observations, a possible explanation of the effect of copper is as follows.

The copper and nickel compounds interact with the carrier, yielding mixtures of compounds which are converted by the subsequent calcination into intimately mixed oxides. During the course of the thermal treatment with hydrogen in order to reduce the oxides into the corresponding metals, the reactions can be carried out at relatively lower temperatures, however with a high degree of Ni reduction being anyway accomplished. A lower reduction temperature prevents phenomena of metal sintering and of collapse of carrier pores with catalysts being consequently formed with a high degree of dispersion of active element and a higher porosity.

The catalyst according to the present invention can be prepared according to two alternative processes.

According to a first embodiment of the present process, the carrier is caused to interact with a solution of Ni and Cu in an atomic ratio comprised within the range of from 1 to 8, preferably of from 1.5 to 3.0, and at concentrations respectively comprised within the ranges of from 5 g/l to 40 g/l and from 2 g/l to 30 g/l, preferably of from 15 g/l to 35 g/l and respectively from 6 g/l to 20 g/l.

The simultaneous attack, by means of suitable reactants, of Ni and Cu powders in order to obtain the solution with which the carrier is caused to interact leads to catalysts displaying better performance; it is thought that during the course of the chemical attack, Ni—Cu interaction complexes are formed and that the presence of copper contributes to the formation of larger pores. The Ni—Cu complexes, following the interaction with the porous support, would originate a Ni—Cu "alloy" which is thought to be the responsible species for the considerable activity increase observed with nickel amount in the catalyst being the same. The particular size of pores, presumably obtained thanks to the presence of copper, would be the responsible feature for the increase in selectivity observed as compared to traditional Ni catalysts.

The suspension deriving from the interaction between the carrier and Ni—Cu solution is then filtered and the resulting solid filter cake is submitted to drying and calcination; the calcined product is exposed to a flowing hydrogen stream at a temperature comprised within the range of from 200° C. to 600° C., preferably of from 250° C. to 400° C.

The second embodiment of the process according to the present invention envisages that the carrier is caused to initially interact with a solution of one of said two metals (either Ni or Cu); the suspension is then filtered and the solid filter cake is caused to interact with a solution of the other metal, with the Ni and Cu concentrations in the solutions being comprised within the range of from 10 g/l to 40 g/l, preferably of from 18 g/l to 35 g/l; after filtration, the process is analogous to the one as according to the first embodiment.

The catalysts obtained according to the above said processes display the following characteristics:

Ni—Cu atomic ratio comprised within the range of from 1 to 8;

molar ratio ($SiO_2$ mol):(metal compounds mol) comprised within the range of from 0.25 to 0.90;

specific surface area comprised within the range of from 150 $m^2/g$ to 300 $m^2/g$;

percent level of pores with a larger diameter than 25 Å comprised within the range of from 30% to 60%.

The catalyst can be used as obtained without being exposed to air, passivated or preferably coated with grease before being exposed to air; in general, the amount of protective grease is comprised within the range of from 50% to 80% by weight.

The catalyst is used in concentrations which preferably are comprised within the range of from 0.04% to 0.12% by weight in the hydrogenations to an iodine number of 80, and of from 0.20% to 0.60% in the hydrogenations to an iodine number close to 0.

A particular and advantageous application of the catalyst according to the present invention relates to its use for the hydrogenation of oils and fats and in particular for the hydrogenation of edible oils and fats. The hydrogenation process is carried out in stirred vat reactors, generally in batchwise mode, and, in some cases, with a plurality of reactors in cascade in order to perform continuous processes. The catalyst, in the solid state, is dispersed throughout the liquid to be hydrogenated, and hydrogen is bubbled through the suspension, at the desired pressure. The hydrogenation of fats according to such a three phase (solid phase, liquid phase, gas phase) process, has the main purposes of increasing the melting point, improving the stability of the oil and obtaining products with constant characteristics also when different types of raw materials are used.

The activity and, in particular, the selectivity of the catalysts used in this process type are of basic importance because the quality of the hydrogenated product depends on them. In general, during the course of the hydrogenation, the process is carried out aiming at keeping at very low levels in the resulting triglycerid the completely hydrogenated components (stearic acid esters), in favour of products with a high content of mono-unsaturated acids (oleic acid), and, to a lower extent, of dienic acids (linoleic acid). It is furthermore necessary, in order to preserve the high nutritional value of the fat and in order to obtain product with desired rheological properties, that the content of trans-isomers be kept at very low levels. These targets can be accomplished, with the process operating conditions being the same, with catalysts having particular morphology and composition characteristics, such as those as obtained according to the present invention.

Going back to the first embodiment of the present process for preparing a catalyst for the hydrogenation of edible or industrial oils, the first process step comprises preparing an ammino complex of Ni and Cu.

The following examples show in detail the processes for obtaining the catalysts according to the invention, without anyway constituting any limitation to its protection purview.

The important data of the preparations relevant to the examples are reported in accompanying Tables 1 and 2, and the physical-chemical characteristics of some products are reported in accompanying Table 5 (in which the specific surface area, the pore volume and the pore radius distribution were determined by nitrogen adsorption by means of the B.E.T. method, and the maximal temperature of reduction peaks was determined by T.P.R. analysis).

EXAMPLE 1

To 1.2 liters of an aqueous solution containing 4.72 mols of $NH_3$ and 0.825 mol of $(NH_4)_2CO_3$, 28.53 g of metal nickel powder and 15.44 g of metal copper powder were added with mechanical stirring; the suspension was then heated up to a temperature of about 75° C. After reaching such a temperature, 100 cm$^3$ of a solution of hydrogen peroxide at 33% by volume was added to the suspension with a constant flow rate and with the temperature of the solution being kept under 80° C.

During the course of hydrogen peroxide addition, nickel and copper are dissolved as ammonium complexes.

After 4 hours the addition of hydrogen peroxide is ended and the solution, of a deep blue colour, is filtered in order to separate any possibly unreacted metal powders. The resulting 1400 cm$^3$ of solution contains 24.51 g of Ni and 15.44 g of Cut that means that during the chemical attack 86% of Ni and 100% of Cu were dissolved as ammino complexes, with the molar Ni/Cu ratio being consequently equal to 1.72.

To the solution, 35.1 g of fossil meal (Celite FC) is added, such as to realize a molar ratio of $SiO_2$/(Ni+Cu) of approximately 0.72, on considering the silica percent content in fossil meal. The suspension is kept with mechanical stirring at room temperature for about 30 minutes, and then is heated up to its boiling temperature during the shortest possible time; the suspension is kept at such a temperature for about 4 hours caring—inasmuch as the process is carried out in an open container—of keeping constant the level of the liquid inside the reaction vat, by means of suitable water additions.

At the end of the treatment, the suspension, of green colour, is separated from mother liquors by filtration; the filtrate, a colourless liquid, contains about 0.01 ppm of nickel and copper; the residue, of light green colour, with a water content of round 50%, is dried at 120° C. for 16 hours in an air-circulation oven, with 104 g being obtained of a crumbly solid material, easily converted into a powder form.

10 g of such a powder is calcined at 400° C. for 2 hours, with a weight loss of 19%.

The calcination residue is charged to a tubular reactor and is exposed to a flowing hydrogen stream (10 l/hour) at 350° C. for 4 hours; 6.9 g is obtained of a black pyrophoric, non-magnetic powder, which is subsequently protected with 12.81 g of grease with a melting point of 60° C.

EXAMPLE 2 (Comparison example)

A comparison catalyst only containing nickel was prepared.

Example 1 is repeated by replacing the copper powder with an equimolar amount of nickel powder, with 104 g of dried solid material being thus obtained. 10 g of such a solid material is submitted to calcination, with a weight Loss of 16% being observed; during the subsequent activation process with hydrogen at a temperature of 400° C., the weight loss is of 15%.

EXAMPLE 3 (Comparison Example)

A comparison catalyst only containing copper was prepared.

Example 1 is repeated with nickel powder being replaced by an equimolar amount of copper powder.

EXAMPLE 4

To a carbonate-ammonium hydroxide solution identical to the one as disclosed in Example 1, 28.53 g of metal nickel powder is added and submitted to chemical attack with hydrogen peroxide; after filtering and evaluation of dissolved nickel (26.37 g), 14.27 g of metal copper powder is added and chemically attacked; the molar ratio of Ni/Cu is 2.

In the solution, 35.8 g of fossil meal (Celite FC) is suspended with stirring, at room temperature, and is caused to interact in the same way as disclosed hereinabove. 102.6 g of dried product is obtained; 10 g thereof is submitted to calcination at 400° C. and is reduced with hydrogen at 350° C.

EXAMPLE 5

A solution of nickel alone and a solution of copper alone, both as ammonium complexes, are prepared according to the process disclosed in Example 1.

To 400 cm$^3$ of ammonia solution containing 16 g of copper, 40.2 g of fossil meal is added; the suspension is caused to interact according to Example 1; the solid material obtained after filtering is suspended again in 1040 cm$^3$ of any ammonium hydroxide solution containing 29.56 g of nickel, according to such modalities and times as reported in the preceding examples.

113.2 g of dried product is obtained.

10 g of such a solid material is submitted to calcination at 400° C. and reduction to 350° C.

EXAMPLE 6

Example 4 is repeated by using a molar ratio of silica to metals of 0.57.

EXAMPLE 7

Example 1 is repeated by using 750 cm$^3$ of a carbonate-ammonium hydroxide solution containing 15 g of nickel and 325 cm$^3$ of carbonate-ammonium hydroxide solution containing 8.1 g of copper. In such a solution, 20.2 g of fossil meal (Celite) is suspended and caused to interact as in Example 1.

EXAMPLE 8

Example 7 was repeated by using a copper complex obtained by reacting CuO, $NH_3$, $(NH_4)_2CO_3$.

EXAMPLE 9

Example 7 was repeated using a molar ratio of nickel/copper of 2.6.

EXAMPLE 10

Example 4 was repeated with an Ni/Cu ratio of 1.75 and adding, when cold, an aqueous solution containing PVA [poly(vinyl alcohol)] with an average molecular weight of 15,000, in such an amount that the weight of (Ni+Cu)/polymer, by weight, is of 5.11. The suspension is allowed to interact for about 30 minutes at room temperature.

The interaction and the following treatment correspond to those as disclosed in the preceding examples.

EXAMPLES 11–13

The powders obtained in Example 1 are submitted, after a preliminary calcination at 400° C., to a flowing hydrogen stream, at temperatures of 250° C., 300° C. and 400° C. respectively.

EXAMPLES 14–15

The powders obtained in Example 8 were submitted, after preliminary calcination at 400° C., to a flowing hydrogen stream, at temperatures of 300° C. and 400° C. respectively.

Catalytic tests

The catalysts prepared in Examples 1–15 were submitted to catalytic tests for activity and selectivity in the hydrogenation of edible oils and for activity in the hydrogenation of industrial oils, under different experimental conditions, according to the following general procedure.

The body of an autoclave of 1000 cm³ of volume is charged with 300 g of soybean oil to be hydrogenated and such a catalyst amount that the concentration of the latter in the reaction media is of approximately 0.08% by weight (100 ppm of total Ni) for the hydrogenations to an iodine number of 80 and of approximately 0.4% for those to an iodine number close to 0, so as to operate under kinetic conditions. The autoclave is sealed and purges with vacuum/inert gas are carried out in order to remove air.

Heating is started and after approximately 2 hours the reaction temperature is reached (about 160° C. for an iodine number of 80 and about 140° C. for an iodine number close to 0); now, the inert gas is replaced by hydrogen, the pressure value is preset as a function of the desired iodine number (24 bars for an iodine number close to 0 and about 2 atm for an iodine number of 80) and the hydrogen tank is connected. Hydrogen is supplied with the reactants being kept with mechanical stirring [about 1380 revolutions per minute (rpm) for an iodine number of 80 and about 530 rpm for an iodine number close to 0], and the consumed hydrogen volume is measured by means of a precision pressure gauge installed on hydrogen tank.

In following Tables 3 and 4, the activities and selectivities are reported for the catalysts of Examples 1–15, used in the hydrogenations to an iodine number of 80 (Table 3) and in the hydrogenations to an iodine number close to 0 (Table 4).

The activities are expressed as hydrogen mols consumed per hour (Table 3) or per minute (Table 4), per each nickel gram.

As regards selectivity, when the iodine number is close to the value of 80, samples are collected in order to determine the contents of saturated acids, unsaturated acids and cis-trans species by gas cromatography, after preliminarily transforming glycerol esters into methyl esters.

TABLE 1

| Example No. | $SiO_2$/metals, by mol | Ni/Cu, by mol | Calcination temperature (°C.) | Reduction temperature (°C.) | Ni % (by weight) in the catalyst | Cu % (by weight) in the catalyst |
| --- | --- | --- | --- | --- | --- | --- |
| 1 | 0.72 | 1.72 | 400 | 350 | 11.20 | 7.06 |
| 2 | 0.72 | ∞ | 400 | 400 | 22.06 | 0 |
| 3 | 0.72 | 0 | 400 | 350 | 0 | 23 |
| 4 | 0.72 | 2.00 | 400 | 350 | 12.49 | 6.76 |
| 5 | 0.72 | 2.00 | 400 | 350 | 12.40 | 6.70 |
| 6 | 0.57 | 2.00 | 400 | 350 | 13.90 | 7.50 |
| 7 | 0.72 | 2.00 | 400 | 350 | 12.10 | 6.52 |
| 8 | 0.72 | 2.00 | 400 | 350 | 12.17 | 6.57 |
| 9 | 0.72 | 2.60 | 400 | 350 | 14.12 | 5.87 |
| 10 | 0.72 | 1.75 | 400 | 350 | 12.20 | 7.53 |

TABLE 2

| Example No. | Calcination temperature (°C.) | Reduction temperature (°C.) | Ni % (by weight) in the catalyst | Cu % (by weight) in the catalyst |
| --- | --- | --- | --- | --- |
| 11 | 400 | 400 | 12.10 | 7.64 |
| 12 | 400 | 250 | 13.09 | 8.20 |
| 13 | 400 | 300 | 13.60 | 8.67 |
| 14 | 400 | 400 | 12.50 | 6.77 |

TABLE 2-continued

| Example No. | Calcination temperature (°C.) | Reduction temperature (°C.) | Ni % (by weight) in the catalyst | Cu % (by weight) in the catalyst |
| --- | --- | --- | --- | --- |
| 15 | 400 | 300 | 13.72 | 7.42 |

TABLE 3

| Example No. | Activity: mols of $H_2$/hour g of Ni | Selectivity | | | | | | |
| --- | --- | --- | --- | --- | --- | --- | --- | --- |
| | | Total % of trans species | % content of stearic acid | % content of oleic acid | % content of palmitic acid | % content of elaidinic acid | % content of linolelaidinic acid | % content linoleic acid |
| 1 | 10.3 | 28.10 | 11.58 | 41.60 | 11.70 | 21.10 | 7.00 | 6.95 |
| 2 | 5.1 | 21.37 | 21.85 | 30.10 | 12.14 | 18.41 | 3.44 | 14.08 |
| 3 | 0.0 | — | — | — | — | — | — | — |
| 4 | 10.9 | 26.26 | 11.59 | 42.94 | 11.62 | 20.52 | 5.74 | 7.56 |
| 5 | 6.0 | 24.52 | 14.35 | 40.42 | 12.08 | 18.70 | 5.82 | 8.58 |
| 6 | 9.7 | 25.95 | 12.44 | 41.62 | 12.10 | 20.56 | 5.37 | 7.85 |
| 7 | 8.2 | 25.83 | 12.07 | 43.45 | 11.72 | 20.15 | 5.68 | 6.88 |
| 8 | 11.8 | 22.70 | 13.77 | 40.66 | 11.24 | 17.12 | 5.58 | 9.26 |
| 9 | 7.4 | 25.66 | 11.62 | 42.93 | 11.41 | 20.72 | 4.94 | 8.37 |
| 10 | 11.8 | 21.13 | 20.74 | 32.74 | 12.03 | 18.31 | 2.82 | 11.79 |
| 11 | 8.5 | 26.00 | 12.12 | 42.96 | 11.14 | 19.09 | 6.91 | 7.51 |
| 12 | 8.4 | 32.14 | 9.99 | 42.30 | 11.90 | 28.50 | 3.46 | 3.81 |
| 13 | 8.5 | 26.46 | 12.50 | 41.27 | 11.25 | 18.85 | 8.38 | 7.38 |
| 14 | 11.9 | 26.64 | 14.32 | 40.23 | 11.52 | 19.21 | 5.43 | 8.84 |
| 15 | 9.8 | 40.38 | 5.14 | 41.04 | 11.00 | 36.84 | 3.54 | 2.36 |

Activity determined at 160° C. -- $H_2$ pressure: 2 bars

TABLE 4

| Example No. | Activity: mols of $H_2$/minute.Ni gram |
| --- | --- |
| 1 | 1.47 |
| 2 | 1.06 |
| 3 | 0.00 |
| 4 | 1.42 |
| 5 | 1.33 |
| 6 | 1.27 |
| 7 | 1.34 |

Activity determined at 140° C. -- $H_2$ pressure: 24 bars

TABLE 5

| Example No. | Specific surface area (m²/g) | Pore volume (ml/g) | % level of pores with longer radius than 25 Å | Maximal temperature of the reduction peak (°C.) |
| --- | --- | --- | --- | --- |
| 1 | 202 | 0.30 | 55 | 192 |
| 2 | 286 | 0.28 | 15 | 370 |
| 3 | 37 | 0.17 | 100 | 191 |
| 4 | ND | ND | ND | 190 |
| 5 | 244 | 0.37 | 34 | 185 |
| 6 | 228 | 0.27 | 23 | 195 |
| 7 | 229 | 0.33 | 37 | 176 |
| 8 | 223 | 0.36 | 40 | 190 |
| 9 | 207 | 0.35 | 36 | 193 |
| 10 | 203 | 0.30 | 50 | 200 |

ND: not determined

We claim:

1. A catalyst suitable for hydrogenating oil and fat, which comprises Ni and Cu at a Ni/Cu ratio of from 1 to 8, the nickel and copper being supported on fossil flour such that the ratio of (a) moles of fossil flour (expressed as moles of $SiO_2$) to (b) the sum of the moles of Ni and Cu is from 0.25 to 0.90, said catalyst having a surface area of from 150 m²/g to 300 m²/g, and from 30% to 60% of the pores of said catalyst having radii greater than 25 angstroms.

2. A process for preparing the catalyst of claim 1, which comprises the steps of (a) reacting with fossil flour an aqueous solution of an ammonia complex of Ni and Cu at a temperature of from room temperature to 100° C., such that the ratio of (i) moles of fossil flour (expressed as moles of $SiO_2$) to (ii) the sum of the moles of Ni and Cu is from 0.25 to 0.90, (b) filtering the resulting precipitated product, (c) drying the product so filtered, (d) calcining the resulting dried product, and (e) subjecting the product so calcined to a hydrogen flow at a temperature of from 250° C. to 400° C., so as to thereby prepare the catalyst of claim 1.

* * * * *